United States Patent [19]

Robinson et al.

[11] Patent Number: 4,512,956
[45] Date of Patent: Apr. 23, 1985

[54] DIGESTER

[76] Inventors: Lee F. Robinson, 3 Athenaeum Hall, Vale of Health, London NW3 1AP, England; Francesco Salimbeni, Riva A Caccia 1, 6900 Lugano, Switzerland; Guiliano Porcari, 17, Via F. 20R21, 6900 Paradiso, Switzerland; Mario Dente, Corso Sempione 38, Milan, Italy

[21] Appl. No.: 551,168

[22] Filed: Nov. 14, 1983

Related U.S. Application Data

[63] Continuation-in-part of Ser. No. 330,600, Dec. 13, 1981, abandoned.

[51] Int. Cl.³ .............................................. B01D 11/02
[52] U.S. Cl. .................................. 422/270; 196/14.52; 208/11 LE; 210/403; 422/273
[58] Field of Search ............................... 422/269–273; 366/227, 228, 231; 208/11 LE; 196/14.52; 127/3, 43; 210/402, 403, 784; 209/156, 270, 293

[56] References Cited

U.S. PATENT DOCUMENTS

| | | | |
|---|---|---|---|
| 756,271 | 4/1904 | Naef | 422/270 |
| 889,159 | 5/1908 | Trump | 422/270 |
| 1,520,752 | 12/1924 | Horwitz | 208/11 LE |
| 2,137,051 | 11/1938 | Jain | 422/270 X |
| 2,466,259 | 4/1949 | Morton | 422/272 X |
| 2,998,307 | 8/1961 | Walker | 422/270 |
| 4,098,648 | 7/1978 | Kraemer et al. | 208/11 LE X |
| 4,306,975 | 12/1981 | Siewert | 210/403 X |
| 4,416,858 | 11/1983 | Robinson et al. | 422/272 X |

FOREIGN PATENT DOCUMENTS

| | | | |
|---|---|---|---|
| 237867 | 7/1926 | United Kingdom | 422/272 |
| 928066 | 6/1963 | United Kingdom | 210/403 |

Primary Examiner—Richard L. Chiesa
Attorney, Agent, or Firm—Lee, Smith & Zickert

[57] ABSTRACT

A rotary digester comprises a shell having means at one end for entry of material to be digested and, at the opposite end, a liquids outlet surrounded by a solids outlets. The solids outlet has a screw which assists in preventing egress of unwanted liquid with the solids.

12 Claims, 7 Drawing Figures

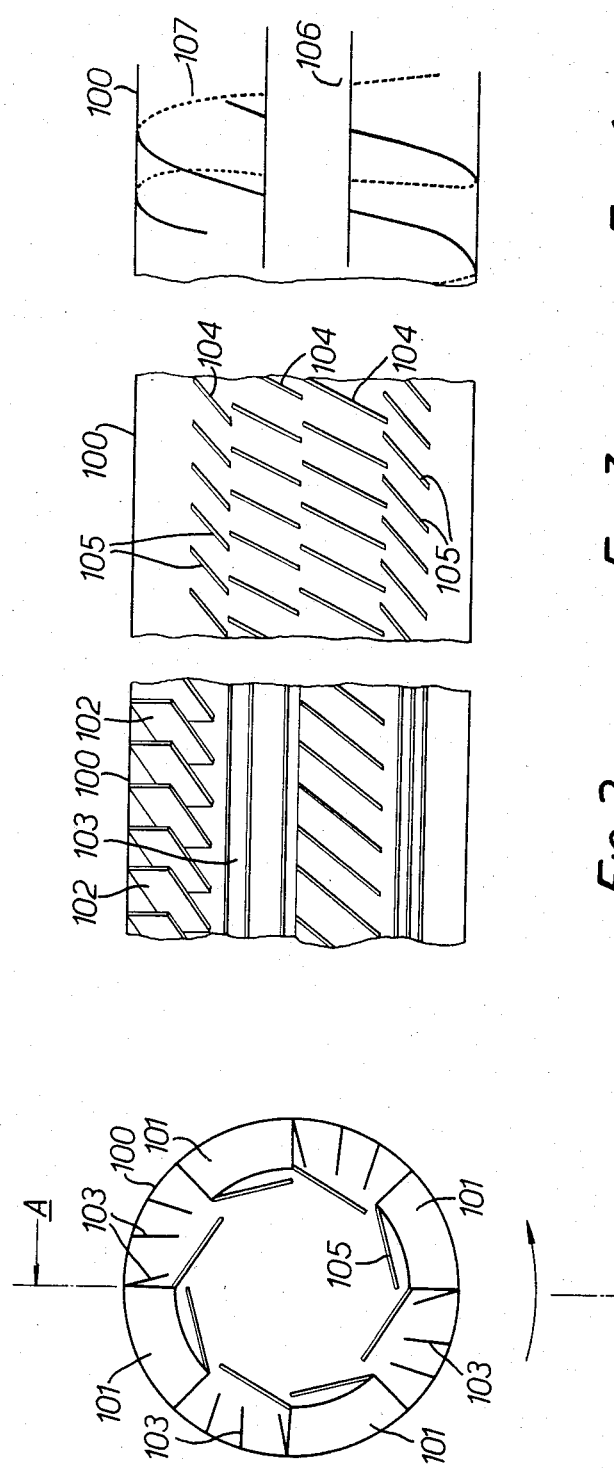

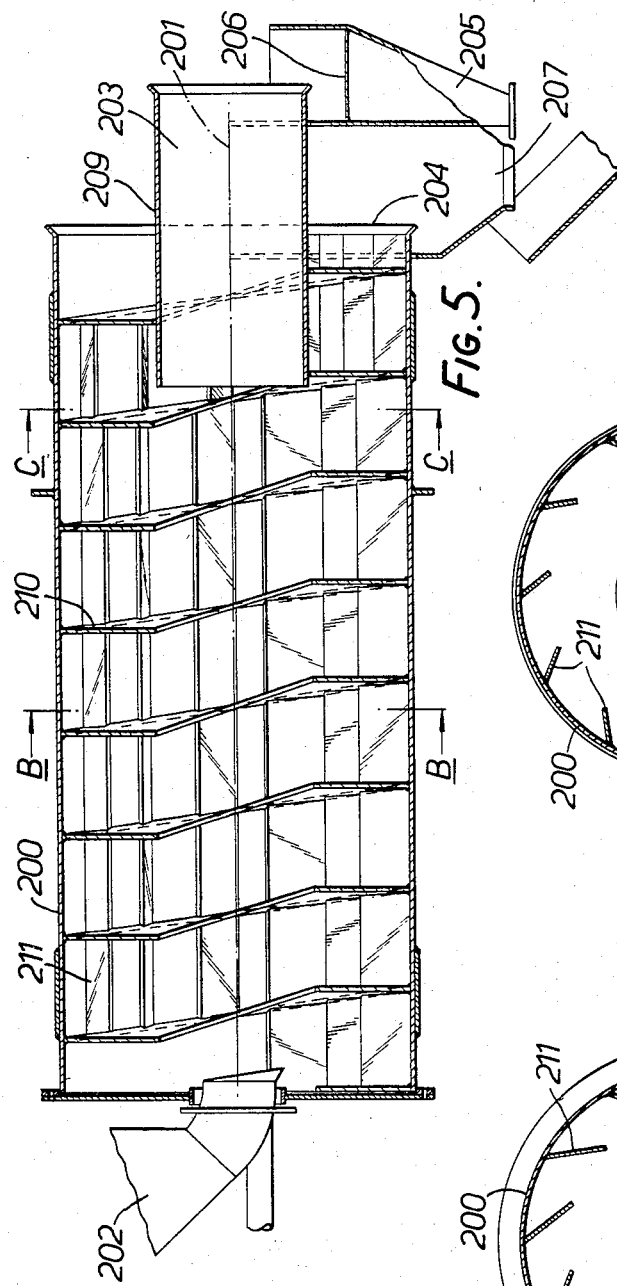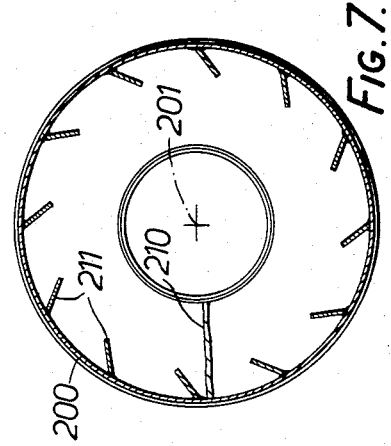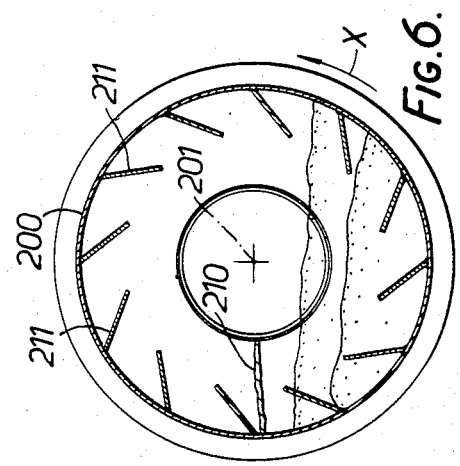

4,512,956

DIGESTER

This application is a continuation-in-part of U.S. Ser. No. 330,600 filed Dec. 13, 1981, now abandoned.

FIELD OF THE INVENTION

This invention relates to a digester for treating solids of a slurry feed in order to leach out a wanted component of those solids. The feed may be an aqueous slurry, but is not necessarily so as the digester may equally be used for acid leaching and caustic leaching. Thus, examples of the uses to which the digester may be put are the leaching of ores, such as copper oxide, with sulphuric acid; the leaching of uranium ores with a caustic solution; the leaching of a constituent from vegetable matter, such as the extraction of contained resin from timber; and the leaching out of contained bitumen oils from an aqueous slurry of oil sands. Where the liquid is acid or caustic, special materials for the digester may be necessitated.

BACKGROUND OF THE INVENTION

As described in copending patent application No. 299,306 filed April 10, 1981, now abandoned, one method of leaching out the bitumen oil content of raw oil sands is to agitate the oil sands gently with relatively large quantities of hot water, the lumps of oil sands being broken up by thermal action and the bitumen oils released. It is further explained in that application that the recovery of the bitumen oils is facilitated if, firstly, the liquid and solids are discharged separately from the leaching process, and, secondly, clay and other dross included in the oil sands are not disintegrated during that process.

OBJECTS OF THE INVENTION

It is an object of the present invention to provide an improved digester for treating the solids of a slurry feed in order to leach out a wanted component of those solids.

It is a further object of the invention to provide an improved digester for the leaching of contained bitumen oils from an aqueous slurry of oil sands.

It is a further object of the invention to provide an improved digester in which the solids and liquids can be separately withdrawn in an efficient manner.

These and other objects of the invention will appear from the following description.

SUMMARY OF THE INVENTION

Accordingly, the present invention provides a rotary digester for digesting solids comprising:
an outer shell;
means for entry of liquids and solids to be digested at one end of the shell;
a tubular, axially extending outlet at the other end of the shell for discharge of liquids;
a solids outlet at the same end as said liquids outlet, surrounding, but separated from, the liquids outlet; and
a screw which surrounds the tubular liquids outlet to urge solids to and through the solids outlet, which screw is secured at its outer periphery to the shell.

It is to be understood that the reference to "solids outlet" does not imply that dry solids only are discharged through that outlet, as some liquid is perforce contained in the solids. Similarly, the liquid discharged through the liquid outlet may contain minor quantities of solids, predominantly in the form of fines. However the arrangement of the screw surrounding the liquids outlet and secured to the shell promotes efficient separation of solids and liquids by minimising the egress of excess liquids with the solids.

BRIEF DESCRIPTION OF THE DRAWINGS

FIG. 1 is a radial section through one form of digester in accordance with the invention;

FIGS. 2 and 3 are sections on the line A—A of FIG. 1, the internal screw bars being omitted at the upper half of FIG. 2, and only those screw bars being shown in FIG. 3;

FIG. 4 is an axial section of the discharge end of the digester;

FIG. 5 is a longitudinal section through a second form of digester in accordance with the invention;

FIG. 6 is a radial section on the line B—B of FIG. 5; and

FIG. 7 is a radial section on the line C—C of FIG. 5.

DESCRIPTION OF THE PREFERRED EMBODIMENTS

Preferably the tubular liquids outlet is supported by the screw which is secured at its outer periphery to the shell.

According to a further preferred feature, the digester has stirrer bars parallel to the axis of the digester and secured to the internal wall of the outer shell. Such stirrers act to continuously renew the contact surface of the solids with the water thus allowing separation of, for example, the bitumen present.

To prevent undue disintegration of large lumps entered with the slurry, a cage may be mounted within, but spaced from, the shell to allow passage therethrough of solids below a given size, but to prevent passage therethrough of oversize lumps, the cage having a slurry inlet leading to the interior of the cage. The cage preferably terminates short of the tubular outlet and has openings which increase in size at the outlet end to allow oversize lumps to pass therethrough prior to solids discharge.

Within the space between the shell and the cage there may be means to urge solids in that space axially towards the solids outlet.

The digester illustrated in FIGS. 1 to 4 of the drawings is constituted by a rotary drum having a shell 100, mounted on rollers for rotation about a horizontal axis and driven through a gearth gear (not shown).

Secured to the internal wall of the shell 100, and extending over the larger part of the length of the drum from one end, there are a number of circumferentially spaced screw sections 101; in the example illustrated, there are four such sections. Each section consists of a series of axially spaced flat bars 102, which are parallel and inclined to a plane at right angles to the axis of the drum, as shown in FIG. 2. The bars 102 extend from the shell 100 only a short distance, compared with the drum diameter. Between consecutive pairs of screw sections 101 are assemblies of stirrers 103. Each stirrer is a flat bar, which is secured to the internal wall of the shell 100, and which extends parallel to the shell axis; as will be seen in FIG. 1, the stirrers 103 are not radially disposed, but each is inclined to the respective radius.

The digester also has sets 104 of internal screw bars 105, eight such sets being illustrated in the drawing with one set aligned with each of the screw sections 101 and each assembly of stirrers 103. Each screw bar 105 is rod like, although preferably it has a square section, and is secured at one end to the extremities of the flat bars 102. Further, as will be apparent from FIGS. 2 and 3, the internal screw bars 105 in each set are inclined to the drum axis in herring-bone style, while the bars of each set 104 are offset from those of the adjacent set.

One end of the shell 100 is closed by an end plate, having a central inlet for entry of feed material. The other end, illustrated in FIG. 4, is open and has a central tubular liquid outlet 106, which extends beyond the end of the shell 100 and over a short axial length of the shell. The tubular liquid outlet 106 is secured in place by a screw 107, the outer periphery of which is welded or otherwise secured to the interior wall of the drum 100. The annular passage which surrounds the outlet 106 and which contains the screw 107 constitutes a solids outlet.

The operation of the digester will be explained in relation to the conditioning of mined oil sands for the leaching out of the contained bitumen oils. However, the digester may be used in other processes where similar conditions apply.

As is known, oil sands are subject to disintegration and release of the contained bitumen oils when treated with water at elevated temperature, little mechanical agitation being needed. Further, it is advantageous if the solids of the mined oil sands can be separated from the liquid at an early stage in the process. In order to simplify the extraction of the released oil sands, it is also desirable that the liquid shall contain a minimum of fines.

With those ends in view, the oil sands are treated by being mixed with hot water at an appropriate temperature to form a slurry, which can contain lumps of foreign matter such as clay, and which is introduced into the digester drum through the inlet. Clearly the oil sands and water may be fed independently to the digester drum and mixed to form a slurry within the drum. The drum itself is rotated in anti-clockwise direction as seen in FIG. 1 at a low rate of, for example, a few revolutions per minute, the slow speed being chosen to avoid break-up of the clay lumps. The slurry enters the central space within the internal screw bars 105; those screw bars have a spacing such that the relatively small masses of oil sands, and the solids from disintegrated oil sands, fall through the screw bars into the annular space between them and the shell 100. On the other hand, large masses of clay are prevented from entering that space and, initially, are moved progressively along the digester, by the screw action of the bars 105.

The oil sands and solids that have fallen through the internal screw bars 105 are gently agitated by the stirrers 103 which, because of their inclination, do not carry the solids far up the digester during rotation of the shell. The stirrers act to continuously renew the contact surface of the solids with the water, thus allowing separation of constituents, such as bitumen which are present. The stirrers are dimensioned so that they do not lift the solids above the interface between the water and any froth present so as to minimise formation of unwanted emulsions. At the same time, the solids are moved progressively axially along the shell 100 by the action of the sections 101 of flat bars 102.

By the gentle agitation of the oil sands by the stirrers 103, the particles of oil sands are broken up, releasing the bitumen oils into the hot water, while the remaining sand is retained between the internal screw bars 105 and the shell 100. Towards the discharge end of the shell 100, the spacing of the internal screw bars 105 is increased, thus allowing the clay masses to fall through them to join the now oil-free sands. The inclination and spacing of the flat bars 102 are such that the solids move axially along the shell at a speed which is substantially less than the throughput of liquids.

At the discharge end of the drum, the liquids—the hot water and the bitumen oils from the oil sands—are discharged through the central tubular outlet 106 and are treated for the extraction of the oil sands, as described in the above-mentioned patent application. At the same time, the solids, which are progressed along the bottom of the drum by the screw action of the flat bars 104, are discharged by the screw 107 through the solids outlet surrounding the liquids outlet 106. The solids, which contain some water and a little oil, are subsequently treated for recovery of the oil and separation of the water, before being returned as infilling. The provision of the screw 107 surrounding the liquid outlet 106 and secured to the interior wall of drum 100 ensures that there are positive means for removal of solids and for minimising the egress of excess liquids with the solids. It is therefore possible to achieve efficient separate collection of liquids and solids.

A second form of digester is illustrated in FIGS. 5 to 7. The digester comprises a shell 200 mounted for rotation by suitable means as indicated by the arrow X in FIG. 6 about a substantially horizontal axis 201. The shell 200 has an inlet 202 for entry of material to the digester and, at the opposite end a central liquids outlet 203 provided by tubular pipe 209, which extends longitudinally beyond the end of the shell, surrounded by an annular solids outlet 204. Liquids outlet 203 discharges into funnel 205 through screen 206 and solids outlet 204 discharge into funnel 207 so that solids and liquids may be collected separately. To avoid liquid overflow from the inlet, the shell is preferably arranged with the front end slightly higher than the tail end.

Secured to the internal wall of shell 200 and extending throughout the length of the digester is a screw 210. In the region of liquids outlet 203 the screw closely surrounds and/or is sealed to the tubular pipe 209 so as to fill the annular space constituting the solids outlet 204. Preferably the tubular pipe 209 and screw 210 are welded over at least 1½ screw turns. This ensures that solids are positively moved along the digester and out of the solids outlet while minimum amounts of liquid egress with the solids.

Arranged circumferentially around the shell and secured thereto and extending between the turns of the screw and running parallel to the axis are stirrer bars 211. In the region of the solids outlet 204 the stirrer bars are reduced in height as shown in FIG. 7 so that they do not project as far into the interior of the shell as do those spaced from the solids outlet. For example, 12 stirrer bars may be circumferentially arranged for every 360° screw turn giving a total of some 82 stirrer bars along the shell, the last 12 of which are of reduced height. The stirrers, as can be seen from FIGS. 6 and 7, are not radially disposed but are inclined at an angle to the respective radius so that they act, on rotation of the shell, to gently lift solids to promote contact with the liquids. Thus they act to continuously renew the contact surface of the solids with the water. It will be noted that, like the stirrers 103 of FIGS. 1 to 4, they are dimensioned and angled such that they do not lift solids above the interface between the water in the shell and any froth present above the water so as to minimise formation of unwanted emulsions.

It will be appreciated that the digester can be used in the manner described for the digester of FIGS. 1 to 4. However in this case solids are moved along the shell 200 by the action of continuous screw 210 rather than by the action of the flat bars 102 shown in FIG. 2.

We claim:

1. A rotary digester for digesting solids comprising:
an outer shell;
means for entry of liquids and solids to be digested at one end of the shell;
a tubular, axially extending outlet at the other end of the shell for discharge of liquids;
a solids outlet at the same end as said liquids outlet, surrounding, but separated from, the liquids outlet; and
a screw which surrounds the tubular liquids outlet to urge solids to and through the solids outlet, which screw is secured at its outer periphery to the shell.

2. The digester of claim 1, wherein the screw supports the liquids outlet.

3. The digester of claim 1 further comprising stirrer bars parallel to the axis of the digester and secured to the internal wall of the outer shell.

4. The rotary digester of claim 1, comprising a cage mounted within, but spaced from, the shell, to allow passage therethrough of solids below a given size, but to prevent passage therethrough of oversize lumps, the cage having a slurry inlet leading to the interior of the cage.

5. The rotary digester according to claim 4, in which the cage terminates short of the tubular outlet and has openings which increase in size at the outlet end to allow oversize lumps to pass therethrough prior to solids discharge.

6. A rotary digester according to claim 5, in which the cage is formed by rods arranged to urge solids within the cage towards the outlet.

7. A rotary digester according to claim 4, in which the cage is formed by rods arranged to urge solids within the cage towards the outlet.

8. A rotary digester according to claim 4, in which there are means in the space between the shell and the cage to urge the solids in that space axially towards the solids outlet.

9. A rotary digester according to claim 8, in which the means are bars secured to the shell and inclined to the axis of the shell.

10. A rotary digester according to claim 9, in which the bars within the space are arranged in circumferential spaced sections, and assemblies of stirrer bars arranged parallel to the axis are provided separating the circumferential spaced sections.

11. The rotary digester of claim 1 wherein the screw extends substantially along the entire shell.

12. The rotary digester of claim 11 comprising stirrer bars extending between adjacent screw turns.

* * * * *